(12) United States Patent
Boers et al.

(10) Patent No.: US 7,746,858 B2
(45) Date of Patent: Jun. 29, 2010

(54) SCALING ENHANCEMENT FOR PIM CONTROL MESSAGES IN MULTICAST VPNS

(75) Inventors: Arjen Boers, Sitges (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 1003 days.

(21) Appl. No.: 11/325,136

(22) Filed: Jan. 3, 2006

(65) Prior Publication Data

US 2007/0153790 A1 Jul. 5, 2007

(51) Int. Cl.
H04L 12/28 (2006.01)
(52) U.S. Cl. .................. 370/390; 370/312; 370/432; 709/238; 709/242
(58) Field of Classification Search .......... 370/392, 370/474; 709/242
See application file for complete search history.

(56) References Cited

U.S. PATENT DOCUMENTS

2005/0180448 A1* 8/2005 Kobayashi .................. 370/432

2008/0114887 A1* 5/2008 Bryers et al. ............... 709/230

OTHER PUBLICATIONS

Fenner et al., "Protocol Independent Multicast-Sparse Mode (PIM-SM): Protocol Specification (Revised)," IEFT Internet Draft (draft-ietf-pim-sm-v2-new-08.ps), Oct. 1, 2003, pp. 1-104.

* cited by examiner

*Primary Examiner*—Jayanti K Patel
*Assistant Examiner*—Matthew Campbell
(74) *Attorney, Agent, or Firm*—Campbell Stephenson LLP (57) ABSTRACT

A mechanism by which PIM network traffic can be aggregated is provided, thereby reducing the number of PIM messages transmitted by routers in a multicast network. PIM messages are adapted to permit information targeted at multiple destination routers to be included in one PIM message. Join/prune lists for a plurality of upstream neighbor routers can thereby be included in a single PIM message. PIM Hello messages can be similarly aggregated in a single PIM message and both PIM join/prunes and PIM Hellos can be aggregated in a single aggregated PIM message. Through such aggregation of information that would traditionally be transmitted in multiple PIM messages, network bandwidth consumption and router load due to transmission of PIM messages can be reduced.

17 Claims, 9 Drawing Sheets

(Prior Art)

SCALING ENHANCEMENT FOR PIM CONTROL MESSAGES IN MULTICAST VPNS

FIELD OF THE INVENTION

This invention relates to the field of information networks, and more particularly relates to modifying protocol independent multicast (PIM) messages in order to reduce network traffic and router load and to thereby provide a scaling enhancement for large-scale networks.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase.

As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's transport network to provide connectivity between the disparate geographic sites of the business' network elements. In order for the business' network to seamlessly function through the provider network, the provider network must be able to provide a medium for transmission of all the business' various types of datastreams, including multicast transmission.

Multicast routing protocols enable multicast transmission (i.e., one-to-many connections and many-to-many connections) by replicating a multicast packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether downstream subscribers to the multicast packet (i.e., members of the multicast group) are connected to the network node (either directly or indirectly). The network node can then replicate the multicast packet as needed and transmit the replicated packets to any connected subscribers.

Figure 1A:
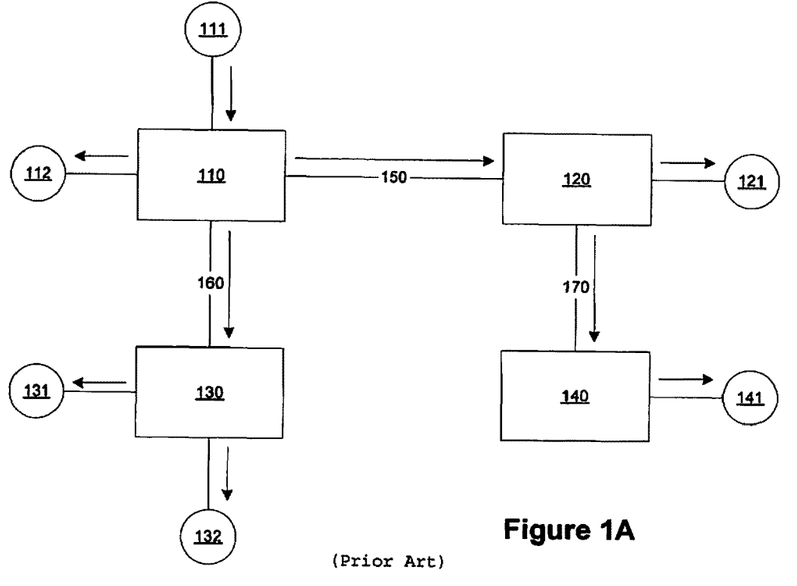
FIG. 1A is a simplified block diagram of a network transporting a multicast transmission.

FIG. 1A is a simplified block diagram of a network transporting a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes receiving network elements 112, 121, 131, 132 and 141. A multicast datastream, having a group destination address to which the above network elements have subscribed as receiver members, is transmitted from network element 111 to network router element 110 (illustrated by the arrow from 111 to 110). Network router element 110 determines where to forward packets in the multicast datastream by referring to a multicast group address table that identifies each port of network router element 110 that is coupled, directly or indirectly, to a subscribing member of the multicast group. Network router element 110 then replicates packets of the multicast datastream and then transmits the packets from the identified ports to network element 112, network router element 120 and network router element 130.

Network router elements 120 and 130 can inform network router element 110 that they are coupled to a subscribing member of a multicast datastream using, for example, a protocol independent multicast (PIM) multicast message. Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a membership report request through a software protocol such as internet group management protocol (IGMP). When a network element wishes to subscribe to a multicast transmission, an IGMP membership request frame can be transmitted by the network element. An IGMP-enabled network router element (or a L2 network device) can have "snooping" software executing to read such a frame and build a corresponding entry in the multicast group address table.

Upon receipt by network router elements 120 and 130, packets from the multicast datastream will be replicated as needed by those network router elements to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

Figure 1B:
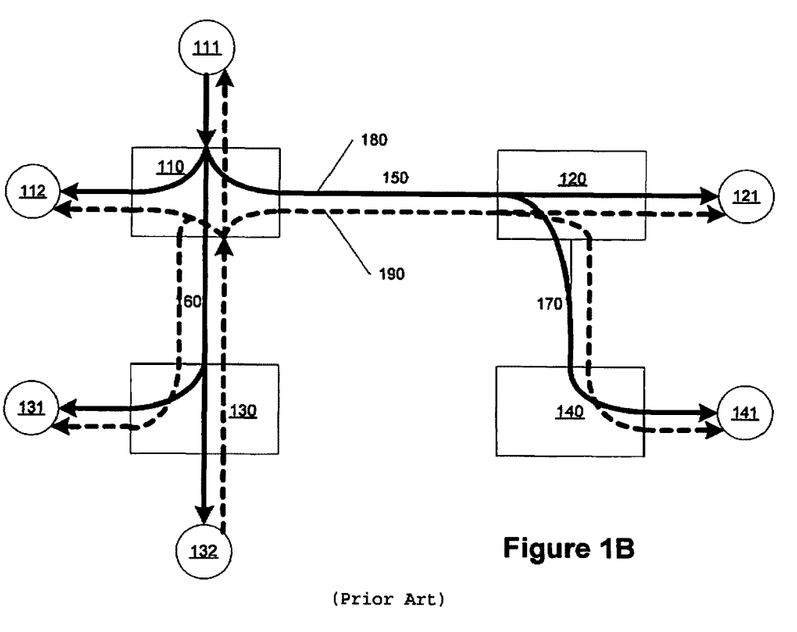
FIG. 1B is a simplified block diagram of a network in which multiple sources are transmitting to a multicast group.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In such bi-directional multicast, datastream packets are routed only along the shared bi-directional tree, which is rooted at a rendezvous point for the multicast group, rather than at a particular datastream source. Logically, a rendezvous point is an address (e.g., address of a network router element) that is "upstream" from all other network elements. Passing all bi-directional multicast traffic through such a rendezvous point, establishes a loop-free tree topology with a root at the rendezvous point. In FIG. 1B, the rendezvous point is illustrated as network router element 110.

FIGS. 1A and 1B illustrate transmission of multicast datastreams in a network in which the network router elements 110, 120, 130 and 140 are directly coupled with one another. But, as stated above, as a business and its network grow, a business' network elements can become geographically diverse, and therefore the path over which the datastream must flow can include an intervening third-party provider transport network.

Figure 2:
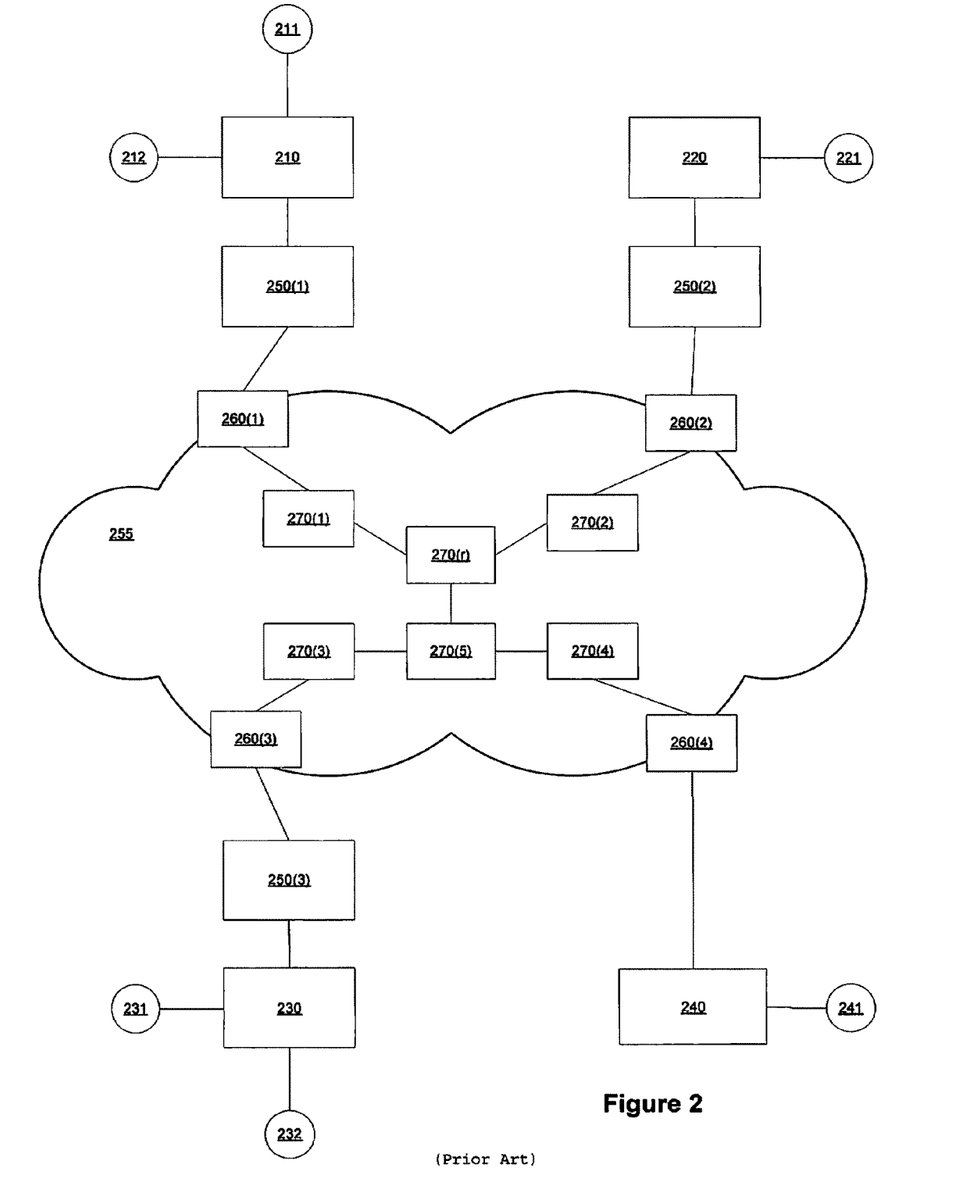
FIG. 2 is a simplified block diagram illustrating a network configuration in which geographically diverse subnets of a business' network are coupled through a provider transport network.

FIG. 2 is a simplified block diagram illustrating a network configuration in which geographically diverse subnets of a business' network are coupled through a provider transport network 255. The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to provider transport network 255, a network router element on the edge of the business' network (a customer edge router) is coupled to a network router element on the edge of the provider network (a provider edge router). In FIG. 2, customer edge router elements 250(1-3) are coupled to provider edge router elements 260(1-3), respectively. Network router element 240 is coupled to provider edge router element 260(4) (that is, network router element 240 is configured as a customer edge router).

It should be noted that the customer edge router and the provider edge router functionality can be provided by a single router. Further, a network router element such as 240 can also serve as an edge router. The provider edge routers provide access to provider transport network 255, which can contain data transmission lines, network router elements, and OSI Level 2 network devices to aid in the transmission of data from one provider edge router to another provider edge router. The provider transport network illustrated in FIG. 2 contains, as an example, network router elements 270(1-5) and 270(r), which are coupled in a manner to permit transmission of packets through the transport network. Such network router elements internal to a transport network are called "core router elements" or "core routers." A provider transport network is not limited to such a configuration, and can include any number of network router elements, transmission lines, and other L2 and L3 network devices.

In order to facilitate transmission of data through the provider transport network, the transport network can utilize different protocols from those used in coupled customer networks. Such transport network protocols can permit faster data transmission and routing through the network. Any needed translation between customer and provider transport network protocols can be performed by the edge routers.

A provider transport network can have a large number of provider edge routers, each of which can in turn be coupled to a plurality of customer networks. In order to maintain privacy between the various customer networks, network traffic from each of the customer networks can be transmitted in a virtual private network (VPN). Each customer can be allocated one or more VPNs depending on the customer's needs.

Figure 3:
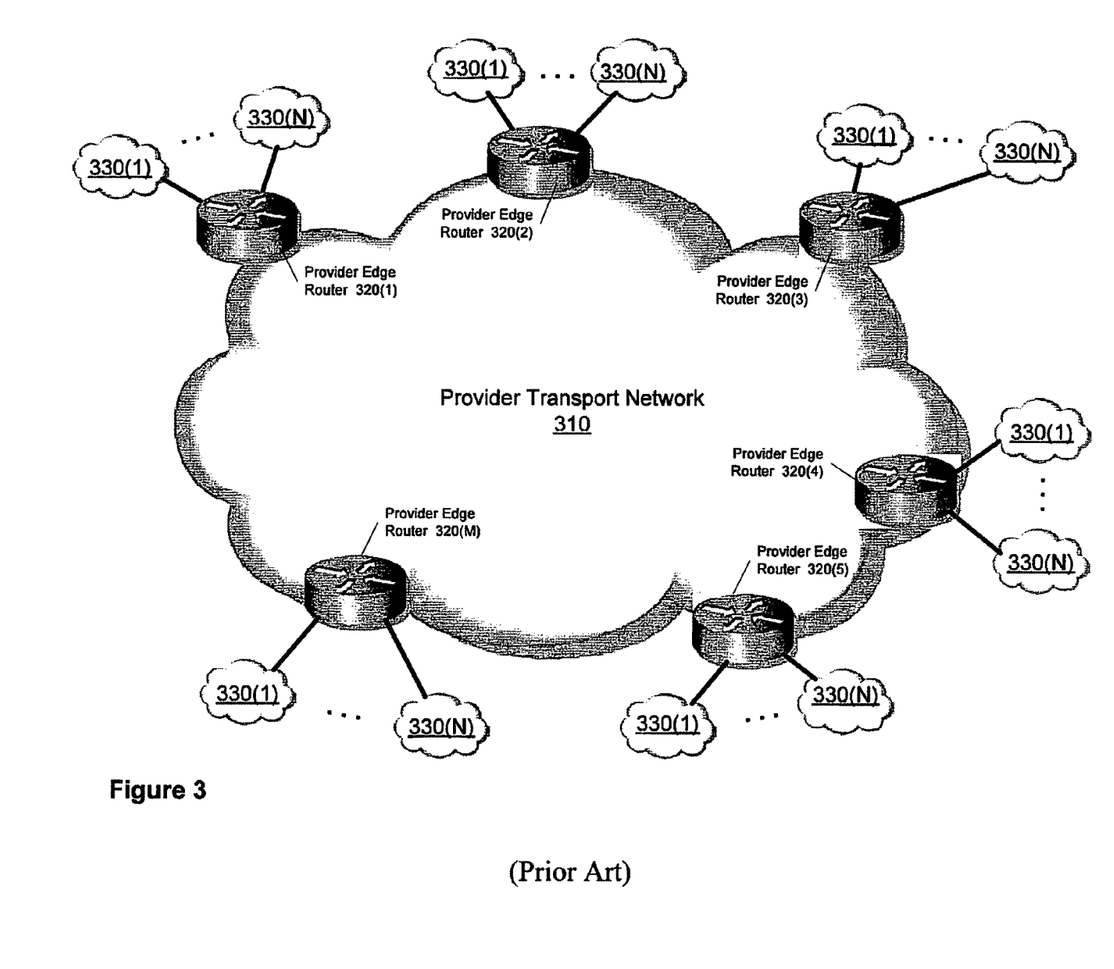
FIG. 3 is a simplified block diagram illustrating a provider transport network providing network support for a number of VPNs.

FIG. 3 is a simplified block diagram illustrating a provider transport network providing network support for a number of VPNs. Provider transport network 310 comprises, in part, provider edge routers 320(1)-320(M). As illustrated, each of the provider edge routers is also coupled, directly or indirectly, to VPNs 330(1)-330(N). While FIG. 3 shows that each provider edge router is coupled to each VPN, it should be understood that each provider edge router need not be coupled to each and every VPN supported by the provider transport network.

A VPN can be configured to support multicast traffic sent from sources to receivers within that VPN. Each provider edge router that supports a multicast VPN (mVPN) customer is part of the multicast domain for that customer. As shown in FIG. 3, multiple customers can be coupled to a particular provider edge router, which means that a provider edge router can be a member of many multicast domains—one for each mVPN customer who is connected to that provider edge router.

As discussed above, PIM is used by routers in a multicast network to provide information about membership to a multicast group or source and group tuple. A network element can express its interest in receiving traffic destined for a multicast group by transmitting an IGMP or equivalent message to a network router element. Upon receiving the network element's expression of interest, the network router can then send a PIM join message toward a root node for that multicast group (e.g., a rendezvous point or a specified source for that multicast group). Join messages are typically known as (*,G) joins because the join message results in joining group G for all sources to that group or (S,G) joins because the join message results in joining group G for a specified source for that group. The (*,G) or (S,G) join message travels hop-by-hop toward the root node and a multicast tree forwarding state for group G is instantiated in each router through which the (*,G) or (S,G) join passes. Eventually, the (*,G) or (S,G) join reaches the root node, or reaches a router that already has a (*,G) or (S,G) forwarding state for group G or source S and group G. When several network elements join a group, their join messages converge on the root node, and form a distribution tree for group G that is rooted at the root node. Join messages are resent periodically so long as a receiver remains in the group. If all receiving network elements coupled to a particular network router element leave a group, then the network router element will send a PIM (*,G) or (S,G) prune message toward the root node.

PIM also supports other message types necessary to the proper functioning of a multicast network. PIM Hello messages are sent periodically on each PIM-enabled interface. Hello messages allow a router to learn about neighboring PIM routers on each interface. A router records Hello information received from each PIM neighbor. In the PIM protocol, Hello messages must be sent on all active interfaces, including physical point-to-point links, and are multicast to a group address that includes all PIM routers within a broadcast domain. Further, Hello messages must be sent periodically in order to refresh PIM-related tables in each PIM router (for example, a typical default Hello timer is set to 30 seconds). Neighbor routers will not accept join/prune messages or other PIM messages from a router unless the receiving routers have first received a Hello message from the transmitting router. Thus, if a router needs to transmit a join/prune or other PIM message on an interface on which that router has not sent a Hello message, then that router must send a Hello message on that interface followed by the join/prune or other PIM message.

In the provider transport network illustrated in FIG. 3, one or more of VPNs 330 can be configured as a multicast VPN. In a multicast VPN, a provider edge router can be called upon to transmit PIM messages across the transport network to neighboring provider edge routers coupled to that VPN. The receiving provider edge routers will then process the PIM messages, transmitting the messages upstream toward a root node of a multicast group as appropriate. PIM Hello and join/prune messages are broadcast to all neighboring PIM routers.

A separate join/prune message is generated for each implicated neighboring router. Join and prune requests are collected for each router over a period of time (typically 60 seconds) and then a PIM join/prune message is compiled for each neighboring router and broadcast through the mVPN. Thus, the number of join/prune messages that can be generated during a period can be equal to the number of provider edge routers (e.g., M) that are members of a mVPN. Further, a provider edge router will generate join/prune messages for each mVPN coupled to the provider edge router (e.g., N).

In a large scale network, where many mVPNs are supported and many provider edge routers are provided, a significant number of join/prune messages can be periodically generated by each provider edge router. Further, since PIM Hello messages are also periodically transmitted to all neighboring PIM routers, a significant number of Hello messages can also be generated. This PIM join/prune and Hello traffic consumes network bandwidth within the provider transport network and creates processing load on the transmitting provider edge routers to generate the various PIM messages. An additional processing load is experienced by the receiving provider edge routers upon receiving the PIM messages, since each router will receive each broadcast PIM message (other than those generated by that router itself).

It is desirable to reduce the quantity of PIM traffic handled by provider edge routers, thereby decreasing the amount of bandwidth consumed by PIM messages and the transmit and receive load on the provider edge routers.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism by which PIM network traffic can be aggregated, thereby reducing the number of PIM messages transmitted by routers in a multicast network. In one embodiment of the present invention, PIM messages are adapted to permit information targeted at multiple destination routers to be included in one PIM message. In one aspect of that embodiment, join/prune lists for a plurality of upstream neighbor routers are included in a single PIM message. In another aspect of the present invention, PIM Hello messages can be similarly aggregated in a single PIM message. In a further aspect of the present invention, both PIM join/prunes and PIM Hellos can be aggregated in a single aggregated PIM message. Through such aggregation of information that would traditionally be transmitted in multiple PIM messages, network bandwidth consumption and router load due to transmission of PIM messages can be reduced.

FIG. 3, discussed above, illustrates a provider transport network 310 that includes provider edge routers 320(1)-(M). Each provider edge router is in turn coupled, directly or indirectly, to mVPNs 330(1)-(N). As an example, a worst-case scenario PIM message generation can include a PIM message being generated for each upstream neighbor provider edge router (M−1 PIM messages), which is done for each connected VPN (N). Therefore, N*(M−1) PIM messages can be generated by each provider edge router. The PIM messages are then broadcast to each provider edge router in a VPN. Assuming that each provider edge router is transmitting PIM messages, each provider edge router can receive N*(M−1)*(M−1) PIM messages during a periodic interval (e.g., a Hello timeout or a join/prune timeout). For example, in a relatively simple network including 10 provider edge routers and 10 VPNs supported by each provider edge router, each router can transmit 90 join/prune or Hello messages during a timeout interval, and can receive as many as 810 messages from the other provider edge routers. All of those transmitted and received PIM messages need to be processed by the provider edge routers.

Rather than transmitting a separate PIM message containing information for each individual upstream neighbor router, the present invention aggregates information for the affected upstream neighbor routers and then broadcasts only one PIM message containing that aggregated information to all the upstream neighbor routers. In the worst-case scenario described above, for all upstream neighbor provider edge routers one PIM message is generated for each connected mVPN. Thus, N PIM messages are transmitted (e.g., 10 in the example). Each provider edge router will then receive N*(M−1) PIM messages (e.g., 90 in the example). Aggregating PIM information in this matter can result in a substantial reduction in network traffic and router load.

Figure 4:
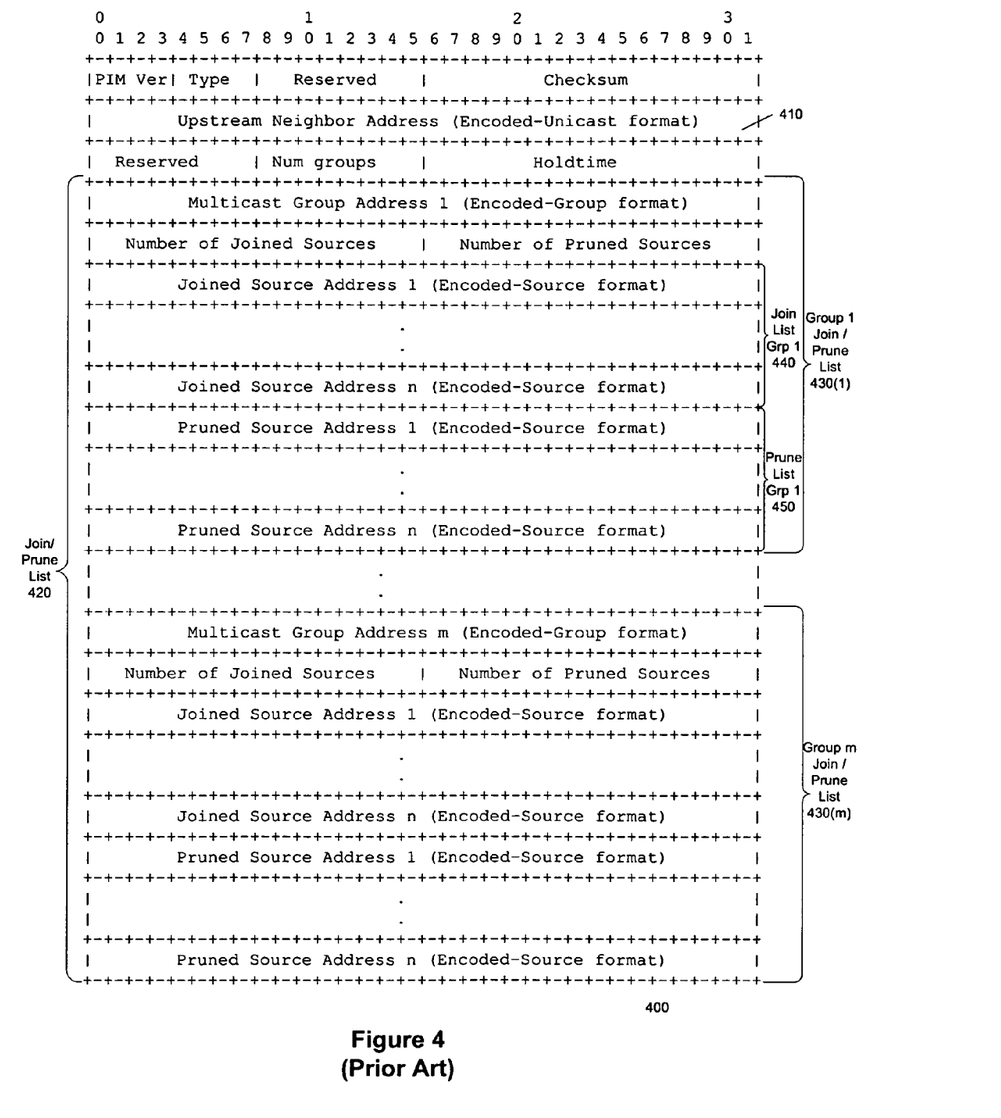
FIG. 4 illustrates the fields of a PIM Join/Prune message according to RFC 2362.

FIG. 4 illustrates the fields of a prior art PIM Join/Prune message. The prior art PIM Join/Prune message is defined in RFC 2362. As discussed above, one PIM Join/Prune message is generated for each upstream neighbor router implicated by a join or prune request received by a router. The implicated upstream neighbor router address is included at field 410. A join/prune list 420 follows. The join/prune list includes join and prune requests 430(1)-430(m) collated for m multicast groups that are coupled to the named upstream neighbor router 410. Each multicast group's join/prune list includes a join list (e.g., 440) and a prune list (e.g., 450). The join and prune requests are collected by a transmitting router over a join/prune timeout period and then periodically collated and placed within the PIM join/prune message as shown.

Figure 5A:
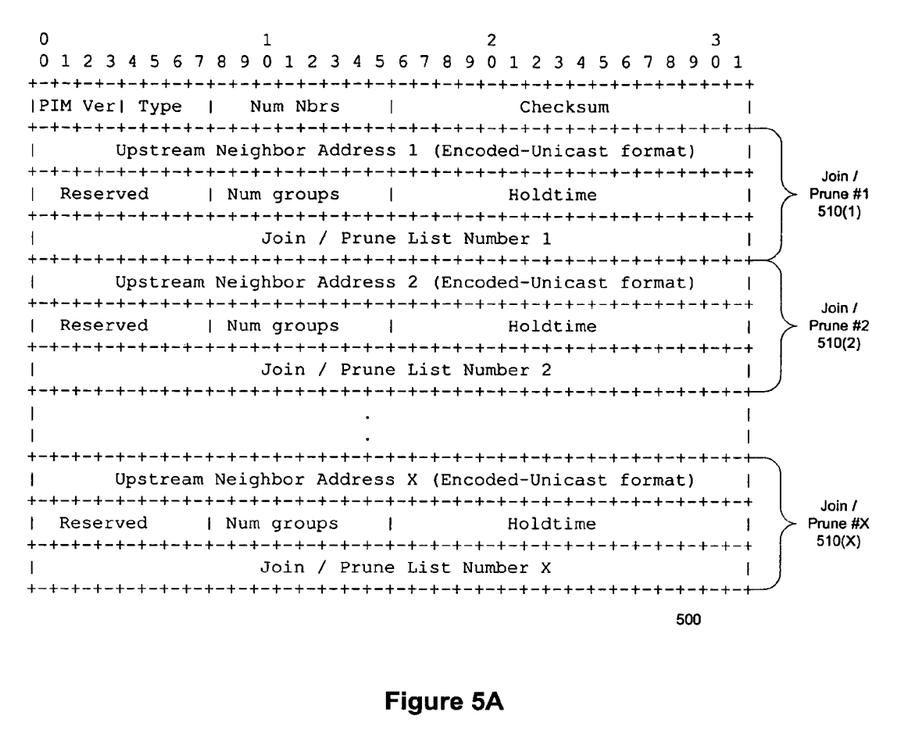
FIG. 5A is an illustration of an aggregated PIM message including join/prune information in accord with one embodiment of the present invention.

FIG. 5A is an illustration of an aggregated PIM join/prune message in accord with one embodiment of the present invention. Aggregated PIM message 500 includes a series of join/prune lists 510(1)-510(X) that each in turn contain information corresponding to join/prune list 420 described above. Therefore, information for X upstream neighbor routers is collected during the join/prune timeout period. That information is collated and placed in one aggregated PIM join/prune message 500. In this manner, one aggregated PIM join/prune message 500 can contain the same information as X prior art PIM join/prune messages. In the mVPN context illustrated in FIG. 3, one aggregated PIM message can be broadcast to all provider edge routers in an mVPN, instead of X packets being broadcast to all provider edge routers in the mVPN, thereby reducing the join/prune PIM network traffic in the mVPN by a factor of X.

PIM message aggregation, using the present invention, is not limited to join/prune information. PIM Hello and PIM Assert message information can also be aggregated in a single message rather than have a plurality of messages be transmitted. In the case of Hello messages, this can result in a substantial decrease in periodic network traffic since each router in a multicast broadcast domain must advertise itself to each other neighboring router periodically.

Figure 5B:
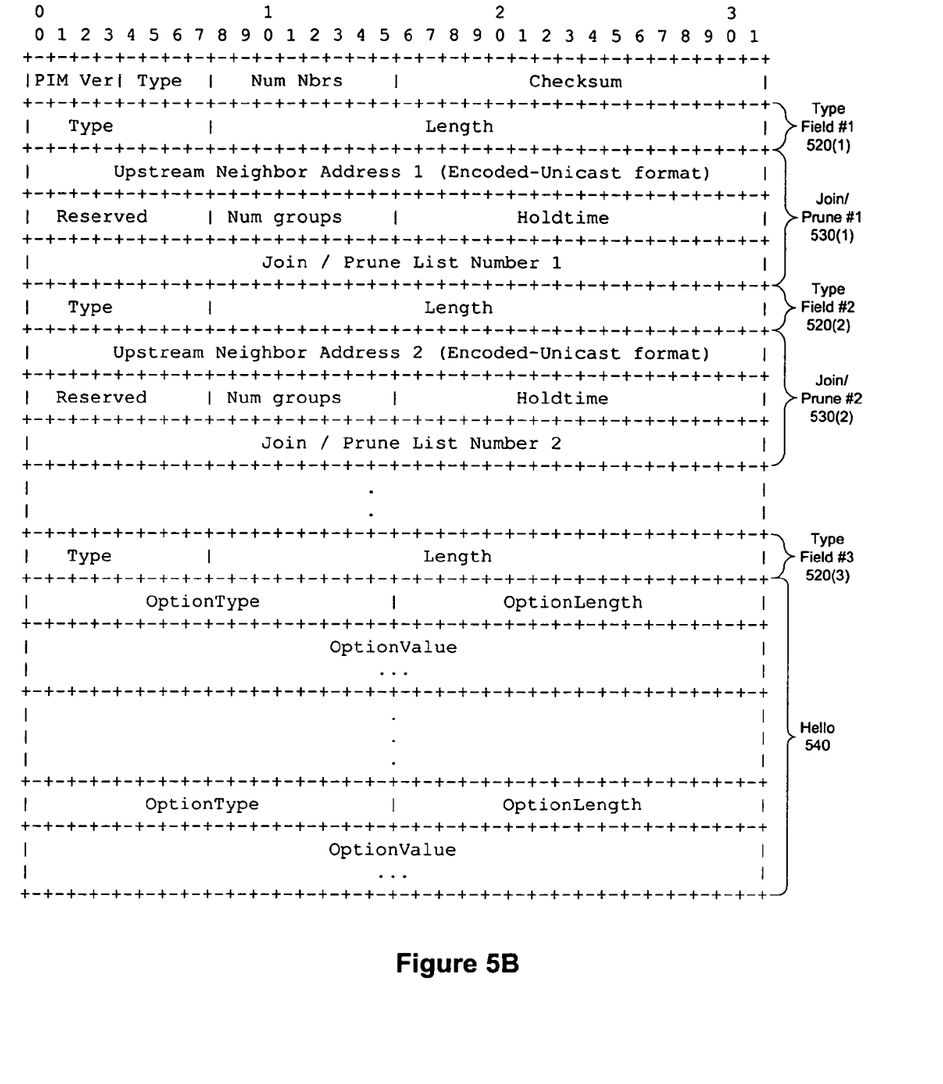
FIG. 5B is an illustration of an aggregated PIM message including both join/prune and Hello information in accord with one embodiment of the present invention.

FIG. 5B is an illustration of an aggregated PIM message including both join/prune and PIM Hello information in accord with one embodiment of the present invention. Included in the aggregated PIM message are type fields 520(1)-(3), which identify the nature of the PIM data that follows the type field as well as the length of that information. Type fields 520(1) and 520(2) are followed by join/prune information 530(1) and 530(2) such as that included in FIG. 5A. Type field 520(3) is followed by PIM Hello information 540. Through the use of Type fields, other types of PIM information, such as PIM Assert messages can be included in an aggregated PIM message. Aggregation of both Hello and join/prune messages realizes additional conservation of network resources.

Figure 6:
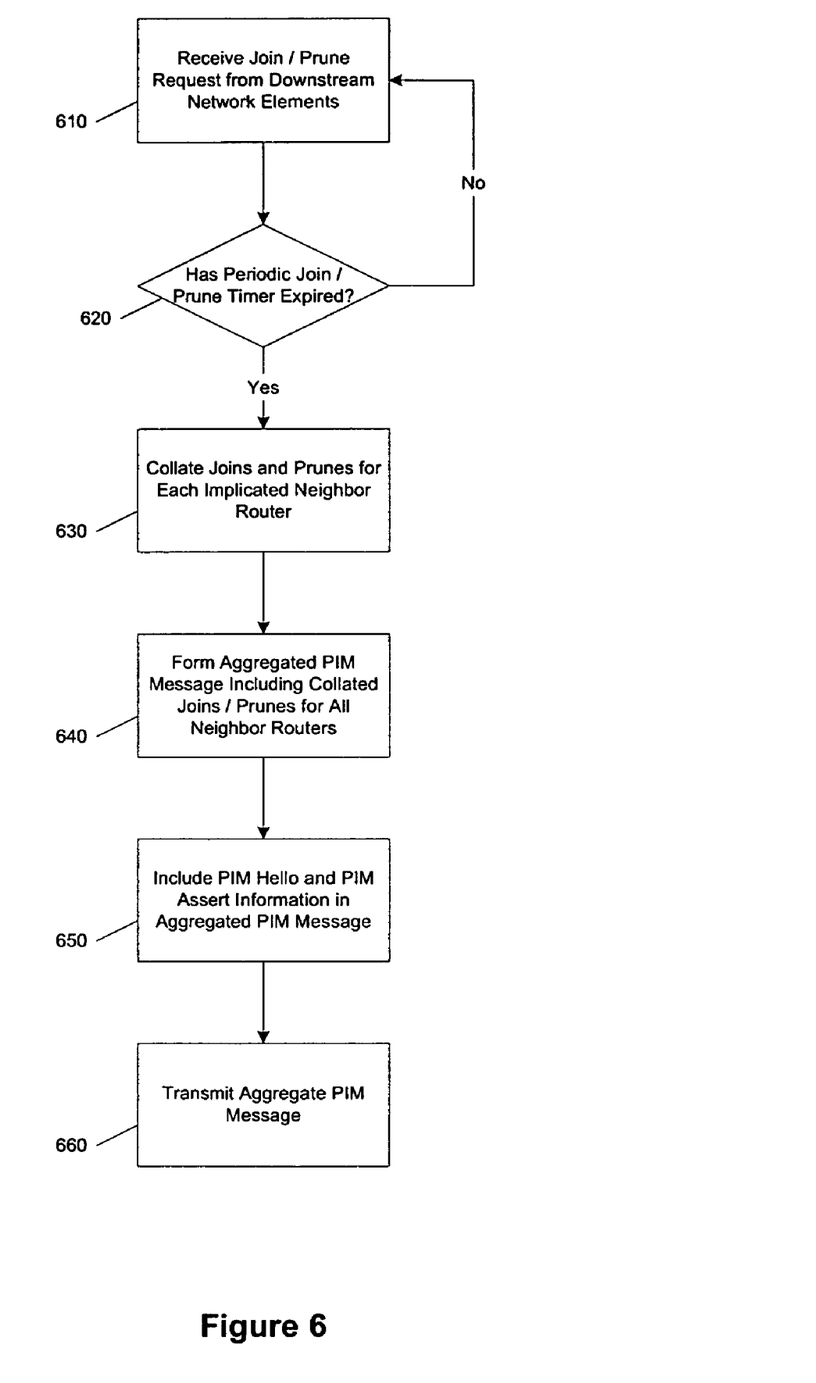
FIG. 6 is a simplified flow diagram illustrating a process performed by a network router in accord with one embodiment of the present invention.

FIG. 6 is a simplified flow diagram illustrating a process performed by a network router in accord with one embodiment of the present invention. A network router can receive a join/prune request from a downstream network element or a downstream network router (610). As discussed above, this join/prune request can be either a PIM message or an IGMP message. The router can then determine whether the join/prune timer has expired (620) and, if not, continues to wait to receive additional join/prune requests. Once the join/prune timer has expired, the router collates joins and prunes for each neighboring router for which a join or prune request was received (630). The router then forms an aggregated PIM message that includes the collated joins and prunes for all the implicated neighboring routers (640). The aggregated PIM message can take a form such as that shown in FIG. 5A or 5B. In addition, the aggregated PIM message can include other types of broadcast PIM messages, including PIM Hellos and PIM Asserts (650). Once the aggregated PIM message is formed, the router transmits the aggregated PIM message to all neighboring PIM routers in the broadcast domain (660). In the case of an mVPN network, the broadcast domain includes the neighboring provider edge routers.

Figure 7:
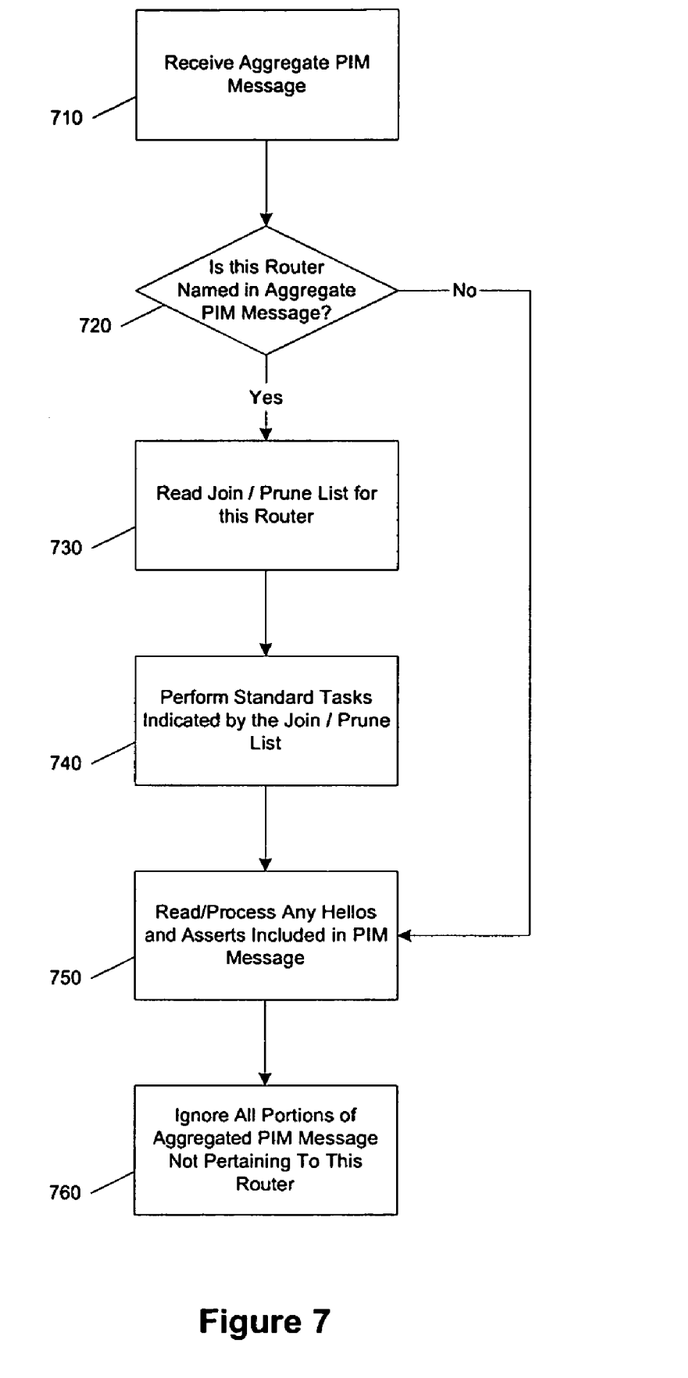
FIG. 7 is a simplified flow diagram illustrating a process performed by a network router receiving an aggregated PIM message in accord with one embodiment of the present invention.

FIG. 7 is a simplified flow diagram illustrating a process performed by a router receiving an aggregated PIM message in accord with one embodiment of the present invention. A router within a broadcast domain receives an aggregated PIM message (710). The router then determines whether that router is named within the aggregated PIM message (720) (e.g., in one of the join/prune lists 510 or 530). If the router is not named in the aggregated PIM message, then the router can process any PIM Hellos or PIM Asserts included in the aggregated PIM message (750). In one embodiment of the invention, a non-named router can also process the join/prune lists in order to override a prune from another router with a join. If the router is named in the aggregated PIM message, then the join/prune list for that router is read (730) and the router can perform standard tasks indicated by the join/prune list (740). Additionally, should the aggregated PIM message include information other than joins and prunes that affect the router (e.g., Hellos and Asserts), the router can perform standard tasks related to those (750). Once the router has completed tasks related to that router that are indicated by the aggregated PIM message, the remaining portions of the aggregated PIM message can be ignored by the router (760).

Since all PIM routers in a broadcast domain (e.g., mVPN or LAN) must parse each broadcast PIM packet, even if that router is not named in the PIM packet, there is no negative impact in using the aggregated PIM message of the present invention. On the contrary, since each router has to process fewer packets, more resources will be available for other processes performed by the router. The present invention can be applied not only in a multicast VPN environment, but also in a LAN including multiple PIM routers. But the reduction in number of PIM packets in a LAN is not expected to be of the same order experienced by PIM routers in a multicast VPN environment. Advantages of the present invention can also be experienced with other PIM protocol messages. As an example, periodic header registers are sent for each source every two minutes to indicate to a rendezvous point that the source is still active. By aggregating such messages into a single PIM message, the amount of PIM messages sent by a router can be substantially reduced.

An Example Router

Figure 8:
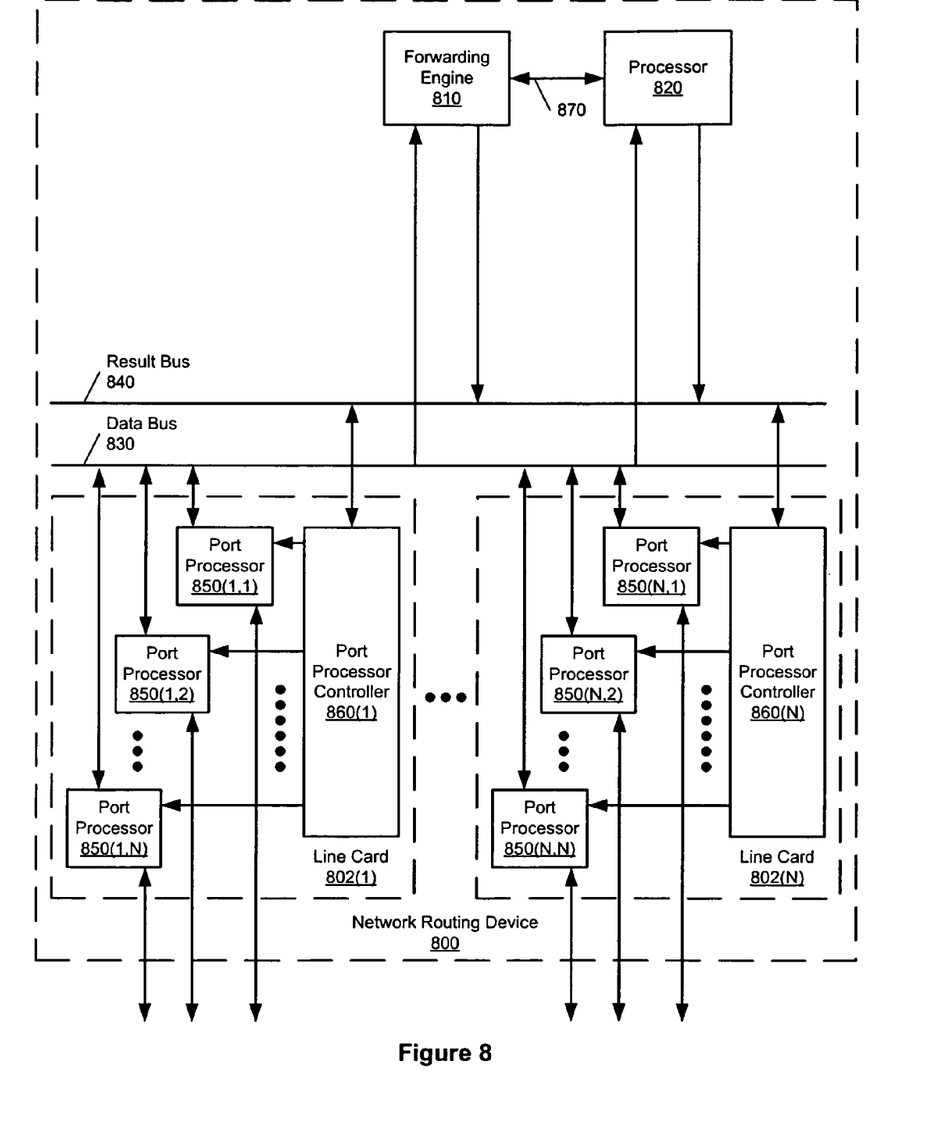
FIG. 8 is a simplified block diagram illustrating a network router element suitable for implementing embodiments of the present invention.

FIG. 8 is a block diagram illustrating a network router element. In this depiction, network router element 800 includes a number of line cards (line cards 802(1)-(N)) that are communicatively coupled to a forwarding engine 810 and a processor 820 via a data bus 830 and a result bus 840. Line cards 802(1)-(N) include a number of port processors 850(1,1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

When a packet is received, the packet is identified and analyzed by a network router element such as network router element 800 in the following manner, according to embodiments of the present invention. Upon receipt, a packet (or some or all of its control information) is sent from the one of port processors 850(1,1)-(N,N) at which the packet was received to one or more of those devices coupled to data bus 830 (e.g., others of port processors 850(1,1)-(N,N), forwarding engine 810 and/or processor 820). Handling of the packet can be determined, for example, by forwarding engine 810. For example, forwarding engine 810 may determine that the packet should be forwarded to one or more of port processors 850(1,1)-(N,N). This can be accomplished by indicating to corresponding one(s) of port processor controllers 860(1)-(N) that the copy of the packet held in the given one(s) of port processors 850(1,1)-(N,N) should be forwarded to the appropriate one of port processors 850(1,1)-(N,N).

In the foregoing process, network security information can be included in a frame sourced by network routing device 800 in a number of ways. For example, forwarding engine 810 can be used to detect the need for the inclusion of network security information in the packet, and processor 820 can be called into service to provide the requisite network security information. This network security information can be included in the packet during the transfer of the packet's contents from one of port processors 850(1,1)-(N,N) to another of port processors 850(1,1)-(N,N), by processor 820 providing the requisite information directly, or via forwarding engine 810, for example. The assembled packet at the receiving one of port processors 850(1,1)-(N,N) can thus be made to contain the requisite network security information.

In addition, or alternatively, once a packet has been identified for processing according to the present invention, forwarding engine 810, processor 820 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of network routing device 800). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A router-implemented method comprising:
   gathering, by a router, multicast group membership information for a first set of multicast groups for a first neighbor router;
   gathering, by the router, multicast group membership information for a second set of multicast groups for a second neighbor router;
   aggregating, by the router, the multicast group membership information for the first and second neighbor routers in one multicast control packet, wherein the multicast control packet comprises:
      a first address for the first neighbor router,
      the multicast group membership information for the first set of multicast groups,
      a second address for the second neighbor router, and
      the multicast group membership information for the second set of multicast groups; and
   transmitting the multicast control packet from the router.

2. The method of claim 1 further comprising:
   aggregating multicast maintenance information in the multicast control packet.

3. The method of claim 2 wherein the multicast maintenance information comprises:
   information comprising a Protocol Independent Multicast (PIM) Hello message.

4. The method of claim 2 wherein the multicast maintenance information comprises:
   information comprising a PIM Assert message.

5. The method of claim 1 further comprising:
   transmitting the multicast control packet to the first neighbor router, wherein the first neighbor router is configured to process the multicast control packet, and the first neighbor router is in a broadcast domain comprising a first set of sources for the first set of multicast groups.

6. The method of claim 1 wherein the multicast control packet comprises:
a PIM Join/Prune message.

7. The method of claim 6 wherein the multicast group membership information comprises:
a set of joined multicast sources.

8. The method of claim 6 wherein the group membership information comprises:
a set of pruned multicast sources.

9. A router element comprising:
a plurality of network line cards, wherein
a first network line card of the plurality of network line cards is configured to receive a multicast membership message, wherein
the multicast membership message comprises multicast group membership information; and
a processor coupled to the first network line card, wherein the processor is configured to
gather multicast group membership information for a first set of multicast groups for a first neighbor router,
gather multicast group membership information for a second set of multicast groups for a second neighbor router,
aggregate the multicast group membership information for the first and second neighbor routers in one multicast control packet, wherein the multicast control packet comprises:
a first address for the first neighbor router,
the multicast group membership information for the first set of multicast groups,
a second address for the second neighbor router, and
the multicast group membership information for the second set of multicast groups; and
transmit the multicast control packet.

10. The router element of claim 9 wherein the processor is further configured to:
aggregate multicast maintenance information in the multicast control packet.

11. The router element of claim 10 wherein the multicast maintenance information comprises:
information comprising a Protocol Independent Multicast (PIM) Hello message.

12. The router element of claim 10 wherein the multicast maintenance information comprises:
information comprising a PIM Assert message.

13. The router element of claim 9 further comprising:
a second network card of the plurality of network line cards configured to transmit the multicast control packet to the first neighbor router, wherein
the first neighbor router is configured to process the multicast control packet, and
the first neighbor router is in a broadcast domain comprising a first set of sources for the first set of multicast groups.

14. The router element of claim 9 wherein the multicast control packet comprises:
a PIM Join/Prune message.

15. The router element of claim 14 wherein the multicast group membership information comprises:
a set of joined multicast sources.

16. The router element of claim 14 wherein the group membership information comprises:
a set of pruned multicast sources.

17. An apparatus comprising:
a plurality of network line cards, wherein
a first network line card of the plurality of network line cards is configured to receive a multicast membership message, wherein
the multicast membership message comprises multicast group membership information;
means for gathering multicast group membership information for a first set of multicast groups for a first neighbor router;
means for gathering multicast group membership information for a second set of multicast groups for a second neighbor router; and
means for aggregating the multicast group membership information for the first and second neighbor routers in one multicast control packet, wherein the multicast control packet comprises:
a first address for the first neighbor router,
the multicast group membership information for the first set of multicast groups,
a second address for the second neighbor router, and
the multicast group membership information for the second set of multicast groups; and
means transmitting the multicast control packet from the router.

* * * * *